United States Patent
Ramakrishna (10) Patent No.: US 8,086,489 B2
(45) Date of Patent: Dec. 27, 2011

(54) METHOD AND APPARATUS TO PROVIDE INFORMATION AND CONSUMER-ACCEPTABLE ADVERTISING VIA DATA COMMUNICATIONS CLIENTS

(75) Inventor: Madhusudana Ramakrishna, Singapore (SG)

(73) Assignee: Affle Limited, London (GB)

( * ) Notice: Subject to any disclaimer, the term of this patent is extended or adjusted under 35 U.S.C. 154(b) by 962 days.

(21) Appl. No.: 11/816,081

(22) PCT Filed: Apr. 26, 2006

(86) PCT No.: PCT/GB2006/001499
§ 371 (c)(1),
(2), (4) Date: Nov. 5, 2007

(87) PCT Pub. No.: WO2006/114601
PCT Pub. Date: Nov. 2, 2006

(65) Prior Publication Data
US 2010/0094710 A1    Apr. 15, 2010

(30) Foreign Application Priority Data
Apr. 26, 2005  (GB) .................................. 0508468.6

(51) Int. Cl.
*G06Q 30/00*  (2006.01)
(52) U.S. Cl. ................. 705/14.4; 705/14.49; 705/14.53; 705/14.67
(58) Field of Classification Search ............... 705/14.49, 705/14.53, 14.67
See application file for complete search history.

(56) References Cited

U.S. PATENT DOCUMENTS

| | | | |
|---|---|---|---|
| 5,848,397 A * | 12/1998 | Marsh et al. | 705/14.61 |
| 6,449,657 B2 * | 9/2002 | Stanbach et al. | 709/245 |
| 6,532,490 B1 * | 3/2003 | Lewis et al. | |
| 7,467,131 B1 * | 12/2008 | Gharachorloo et al. | |
| 2002/0042923 A1 * | 4/2002 | Asmussen et al. | |
| 2003/0055816 A1 * | 3/2003 | Paine et al. | |
| 2004/0236736 A1 * | 11/2004 | Whitman et al. | |
| 2005/0283468 A1 * | 12/2005 | Kamvar et al. | |
| 2006/0106769 A1 * | 5/2006 | Gibbs | |
| 2006/0161541 A1 * | 7/2006 | Cencini | |
| 2006/0259479 A1 * | 11/2006 | Dai | |
| 2007/0088681 A1 * | 4/2007 | Aravamudan et al. | |
| 2007/0088686 A1 * | 4/2007 | Hurst-Hiller et al. | |
| 2007/0143262 A1 * | 6/2007 | Kasperski | |
| 2008/0319992 A1 * | 12/2008 | Mathai et al. | 707/5 |
| 2009/0006543 A1 * | 1/2009 | Smit | |

FOREIGN PATENT DOCUMENTS

EP    1447758    *  8/2004

OTHER PUBLICATIONS

Anonymous: "Mac OS X Tiger: Spotlight" [Online] Nov. 20, 2004 pp. 1-2.*

* cited by examiner

*Primary Examiner* — Raquel Alvarez
(74) *Attorney, Agent, or Firm* — Leason Ellis LLP (57) ABSTRACT

In a data communication system a SMS data communication client operates in known fashion. An additional communication channel is established and data being entered into the client is transmitted to a central server. At the server end the user is identified in a customer database which also stored a profile of the user. Information from an ad database is selected for transmission back to the client in dependence upon the data and profile. Where the information takes the form of advertising, it may be displayed by the client as a truncated indicator during message entry and a fuller composition with active links after sending is completed.

4 Claims, 4 Drawing Sheets

METHOD AND APPARATUS TO PROVIDE INFORMATION AND CONSUMER-ACCEPTABLE ADVERTISING VIA DATA COMMUNICATIONS CLIENTS

CROSS-REFERENCE TO RELATED APPLICATIONS

This application is a 35 USC §371 application of International Application NO. PCT/GB2006/001499 filed Apr. 26, 2006, which claims priority to Great Britain Application Number 0508468.6 filed Apr. 26, 2005, both of which are hereby incorporated by reference in their entirety.

BACKGROUND OF THE INVENTION

The present invention relates to method and apparatus to provide information and consumer-acceptable advertising via data communications clients.

FIELD OF THE INVENTION

In many forms of data communication a data client, such as a personal computer running internet browser software client, the data ultimately sought is not held on the user's equipment but on a host computer or server. Of course an internet browser is optimized for searching and most search engines (Google, MSN, etc.) are available for use with direct charge to the user; revenue instead coming from a levy on websites visited via sponsored links. Moreover, many destination websites themselves have embedded or pop-up advertising.

As far as sponsored links are concerned, these are displayed as a direct result of a targeted search by the user and can be considered valid search results. Embedded or pop up advertising, by contrast is not advertising likely to provide a user with on target competitive information; the former being restricted to those products offered by the proprietor of the site visited and the later being typically for unrelated and often unwanted services. Such advertising can often be annoying to the user and generally taint the use of the data client as an advertising channel. Nonetheless the advertising potential of such a channel is obvious and the present invention seeks to provide user acceptable advertising via the data communication client.

The data client may be the Internet browser itself or other applications capable of direct communication such as an e-mail client or other messaging application. Alternatively, the invention may be applied to applications which are not themselves communication clients but nonetheless are capable of gathering information which could be used to provide useful information and acceptable advertising to a user via a data communication client.

The user equipment could be a straightforward personal computer or workstation with an internet connection or any other communication capable device connectable to a server such as a mobile terminal, mobile phone, Personal Digital Assistant or other wireless terminal device.

Where the equipment is a mobile device, particular problems exist in that off target or random advertising could be especially annoying since such devices have small screens and restricted bandwidth. An application which permitted unrestricted advertising for example may occupy so much screen area or channel bandwidth as to render the device useable for that application. The same may apply to non-advertising information and as such users would be deprived of useful information and advertising and providers of potential advertising revenue. The present invention seeks to provide information and user acceptable advertising via the data communication client of a mobile device.

According to an aspect of the present invention, there is provided a method for providing information, advertising or other relevant data to a terminal device, the method comprising establishing a communications link to a remote data system, transmitting data being entered, accessed or received, or data derived or predicted from data being entered, accessed or received using the terminal device to the remote data system via the communications link, receiving information, advertising or other relevant data from the remote data system via the communications link, the information, advertising or other relevant data being selected in dependence on the data transmitted, and receiving displaying the selected information, advertising or other relevant data at the terminal.

According to another aspect of the present invention, the system comprises a data communications system arranged to establish a communications link to a remote data system, capture and transmit data being entered, or accessed, by, or data derived or predicted from data being entered, accessed or received by a user into the data communications system to the remote data system via the communications link, and receive information, advertising or other relevant data from the remote data system via the communications link, the information, advertising or other relevant data being selected in dependence on the data transmitted.

The terminal device may be a mobile telephone or PDA.

Preferably, the communications link is established using a data communications client and transmission is via the client which may be an email client, Small Message System client or the like.

Preferably, the communications link is dedicated or separate to the communications link used to communicate SMS messages, emails and the like by the client. SMS messages are typically delivered on the control channels of a GSM network. The advertising is delivered over a separate communications link to an ad-server which is a GPRS or 3G data link. Typically such a link is not established by the mobile phone to deliver the SMS itself. In the case of email, a similar data channel is established only after the composition of the email is finished and it is time for it to be sent to the recipient.

Preferably, the information, advertising or other relevant data is obtained in substantially real time to enable display of the information, advert or data while the user is still entering or accessing the transmitted data.

As additional data is entered or accessed, the advertising or other data for example may be refined by a feedback loop.

It will be appreciated that unlike a targeted search using a search engine the information or advertising transmitted is derived from data entered into the terminal device in the context of another application (e.g. writing a letter using a word processing application) or task (e.g. sending an SMS text message). Thus content selected from that available at a server is pushed to the terminal device in a context or data dependent manner.

In another aspect of the invention the user may browse the past content served using a simple interface and choose data which is relevant to him in the present context. The interface could be present for example on a mobile phone or could be presented through the internet or other similar means. The interface would include a method of modifying past data and advertisements to account for a change in context and may be used either in real time or to modify a profile stored for future use. Refinement could also be performed using pre-acquired data on the user (based on prior data or inputted preferences). Hence another aspect of the invention is refinement of advertising and other relevant data by using active consumer feedback. The consumer is able to browse advertising history and look at the associated context to understand how the choice of relevant content was made. He will then have an option to choose a more relevant advertisement or data to be associated with a context. Such active feedback data will be used to refine the selective behaviour of the server and the client.

The method and system could be implemented in hardware, software, firmware or some combination.

In one embodiment, a client transmits data in real-time as electronic messages are input by a consumer. A secure communications link established for that purpose and separate from the purpose of sending the electronic message to the intended recipient is established, the data transmitted to a remote system where it is processed and analyzed together with collected information about the consumer, in order to choose relevant advertisements, messages or promotions, which are then transmitted back to the client which is then displayed on the portion of user interface which the consumer has authorized in prior to be used for such display, that portion distinctly different and demarcated from the electronic message body.

In another embodiment, a client transmits data in real-time as a consumer receives electronic messages. A secure communications link is established separately from the links established for normal use of the client, the electronic messages being analyzed and relevant advertisements, messages or promotions is chosen and transmitted back to the client, the client displays such advertisements, messages or promotions in a delayed manner when the customer starts to read his electronic message, the display portion having been authorized in prior by the customer, that portion distinctly different and demarcated from the electronic message body. The client will have intelligence to associate different delivered advertisements with different received electronic messages, thus displaying the right advertisement when the right message is being read by the consumer.

In another embodiment, a graphical user interface is modified on mobile telephone handsets such that a portion of the screen is dedicated to being an advertising channel, the consumer having agreed to such a change in return for an direct economic incentive, the advertising channel being always available in real-time, data about the customer is collected and analyzed to choose the advertisements to be pushed to the channel, alternatively the modified GUI on the handset allowing the consumer to pull specific advertisements or promotions by entering his request.

The advertising channel may run in the background all the time, except when it is triggered to display on the screen by certain user activity that is associated with the likelihood of the user looking at the screen. The method is a form of intelligent targeted background advertising to ensure that advertising channel can be activated or de-activated depending on user-phone context.

BRIEF DESCRIPTION THE DRAWINGS

In order that features and advantages of the present invention may be further appreciated embodiments will now be described, by way of example only, with reference to the accompanying diagrammatic drawings, of which:

FIG. 5 (a) shows a GUI interface during message composition; and

DETAILED DESCRIPTION OF THE INVENTION

In summary, according to one aspect of the invention in a data communication system (FIG. 2) a SMS data communication client (21) operates in known fashion. An additional communication channel (23) is established and data being entered into the client is transmitted to a central server (22). At the server end the user is identified in a customer database (24) which also stored a profile of the user. Information from an ad database (25) is selected for transmission back to the client in dependence upon the data and profile. Where the information takes the form of advertising, it may be displayed by the client as a truncated indicator during message entry and a fuller composition with active links after sending is completed.

In a preferred embodiment of the present invention includes a mobile phone graphical user interface to establish a channel for marketing.

The major operating systems on mobile phones today are Symbian, Palm OS, Microsoft CE and others which are proprietary to the manufacturer. The trend however is towards non-proprietary or more open systems to encourage development of new applications on the operating system.

Figure 1:
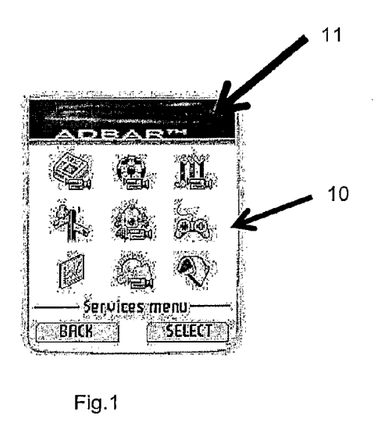
FIG. 1 represents a mobile phone GIU modified in accordance with the present invention.

The invention is implemented as a software package that can be downloaded to a mobile phone and which will then customize the graphical user interface and other relevant aspects in the following ways:

a. At least 15% of the screen space (FIG. 1) is taken over by the client application which can display images, banners, interactive applications etc all the time or at the time of its choosing. This term is referred to as 'adbar' (11) in the rest of the document.

b. The client communicates in real-time with the server application that may be part of the central infrastructure.

c. The protocol used for the communication is a secure form of GPRS. The normal use of the mobile phone with respect to voice calls, electronic messages, Internet usage will all be unaffected and within the control of the consumer and the mobile service provider.

d. The adbar 11 has a system to autohide when the phone is not in use in order to conserve battery power. Unlike current SMS/MMS advertising, the adbar does not rely on actively notifying the customer when it is running any ads. Instead it will run non-intrusively in the background and will only come up when the user has a high likelihood of looking at the screen.

e. User activities when there is a high likelihood of looking at the screen are sending and receiving electronic messages, looking up phonebook or addressbook, modifying phone settings, modifying calendar and running other applications on the screen which requires visual interaction.

f. There are design features that provide the consumer choice in the form of the nature of the ads and also the ability to turn off the ad-bar when needed. However, it is envisaged that the user would have to turn it on for a certain minimum number of ads in return for the contractual advantage with the service provider or sponsor of an economic incentive.

An advantage of the present invention is that consumer acceptance of content may be establish in a clear and binding fashion leading to low risk or tolerance of annoyance to the detriment of advertising effectiveness or revenue.

Consumers may be provided with a direct economic incentive so that they agree to let advertising be presented directly to their mobile phones, specifically:

a. The consumer will have a hardware discount during purchase;

b. The consumer will have a monthly airtime/charges discount which will also be tied into their use of the adbar;

c. In return, the consumer will provide for example the service provider or like interested party with data about specific interests, likes, dislikes, purchasing habits, location information and other kinds of information relevant to marketing; and d. The consumer will at their option also sign a binding agreement to receive information advertising, promotion and other services through the adbar. The consumer will also agree to real-time targeting advertising based on the content and source of his electronic message. The consumer will allow a software client to be installed that will transmit in real-time electronic message contents as they are typed out prior to sending out, the client will also transmit in real-time received electronic messages prior to their being read by the consumer.

The invention enables real-time targeting advertising based on electronic message content and individual customer profile & delayed delivery for received messages. In the case of received messages for example, there is a lapse of time between the message being delivered to a consumer and him or her actually opening the message to read it. In the case of SMS for example, there is typically a message received notification for the consumer to click and open to proceed to the contents of the message. In this particular scenario, the invention enables the relevant advertising information to be sent to the client during this particular time difference hence enabling a faster user experience.

Figure 2:
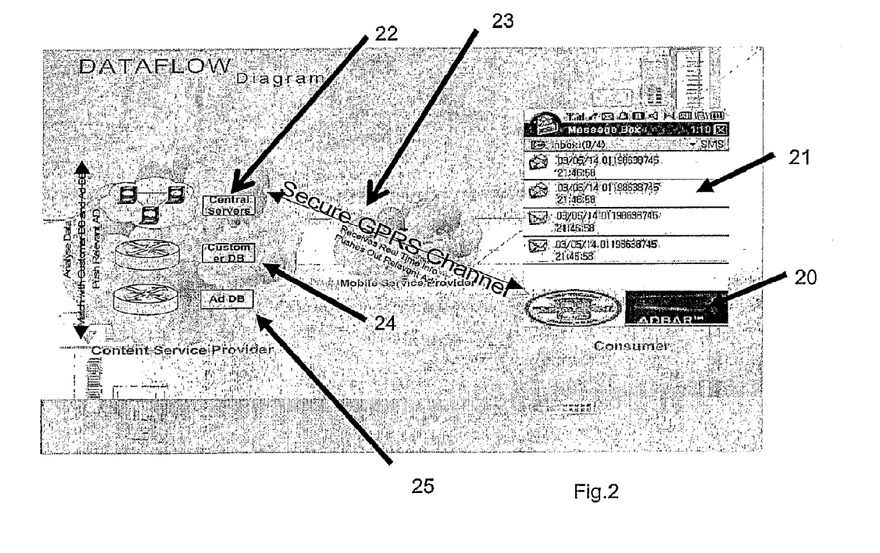
FIG. 2 shows data flow in accordance with the present invention.

Dataflow within the system is set forth in FIG. 2. The client for the adbar 20 reads in real-time as the consumer types out or is reading in real-time an electronic message 21 on his mobile phone. The client then transmits the data to a central server 22 through the separate secure GPRS channel 23. The central server has the computing power to recognize keywords, associate them with the rest of the consumer database 24, choose relevant content from the content database 25 and deliver it to the client for display. All this is done in real-time preferably in a contractual framework, making the marketing both relevant and acceptable.

When the consumer receives an electronic message, the client also reads and transmits the data out to the server. This enables delivery of personalized content to the consumer. Such content will preferably be displayed once the consumer starts to read his electronic message.

The adbar is one way of implementing the present invention and provides both an indication that advertising is active and a revealable link to either the advertisement itself or further dialogue to items of potential interest.

In other embodiment, the advertisement regime is divided between a teaser ad and a functional ad.

Figure 5A:
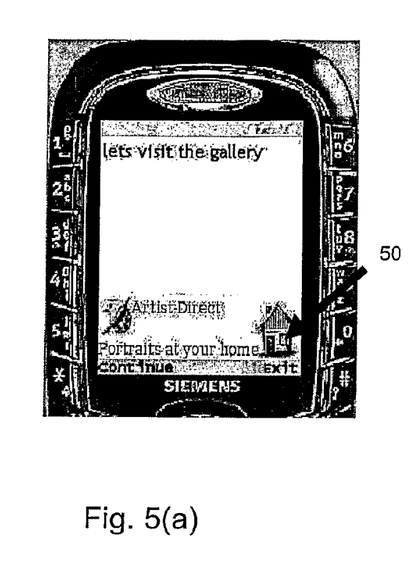
Figure 5B:
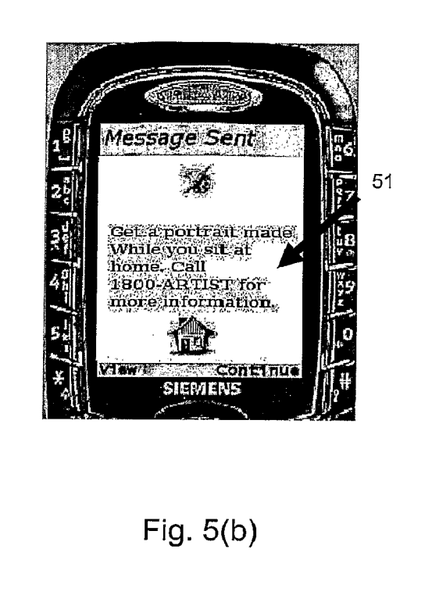
FIG. 5(b) the interface after sending is complete.

For example, whilst an SMS message is being entered and after the text has been sufficiently analysed for the server to be able to supply some context, one or more teaser ads (50, FIG. 5(a)) are displayed. Once the message is sent a functional ad (51, FIG. 5(b)) is displayed, for example along with the sent message notification. The functional ad is a fuller display preferably with active links to allow actual products or services to be ordered or accessed.

In some embodiments, ads may be stored in the terminal device. For example if a functional ad matching a newly transmitted teaser ad is already stored it will be displayed for added speed of operation; otherwise the functional ad will be transmitted. Further speed improvements may be forthcoming if some extra data is added during message transmission containing the results of any parsing or language processing that has already been applied by the server. In this way, repetition of activity at the server associated with the receiving device may be reduced.

A similar approach may be adopted during message reception, with the teaser ad being displayed with a message arrival notification or initial reading and the functional ad during reading, after a certain perusal time or after message losing.

It may be noted that the system may be arranged such that the ads are the same, or different as obtained by the sender and the receiver. If the ad represents a global service, it may be appropriate to include data in the transmission to ensure that the sending teaser and the receiving teaser are the same. The functional as could then be either the same, or locally generated (for example to reflect regional pricing or dealerships) as appropriate.

Equally, the profile, context and location may be considered to avoid sending ads for meat products to vegetarians or ice cream ads during winter or to those experiencing cold weather, even though at the sender's location it may be hot.

The regime of selection and data transfer will now be described in more detail and is based on a content serving (ad serving subsystem) installed by the service provider.

The real time ad serving subsystem enables the client to connect to the server, inform it of the data being input or viewed by the user, and fetch ads or other relevant information and display it to the user in a timely manner. The protocol FIG. 3 contains two participants: the client software 30, and the ad server 31. The protocol may be discussed in terms of the following functions.

Figure 3:
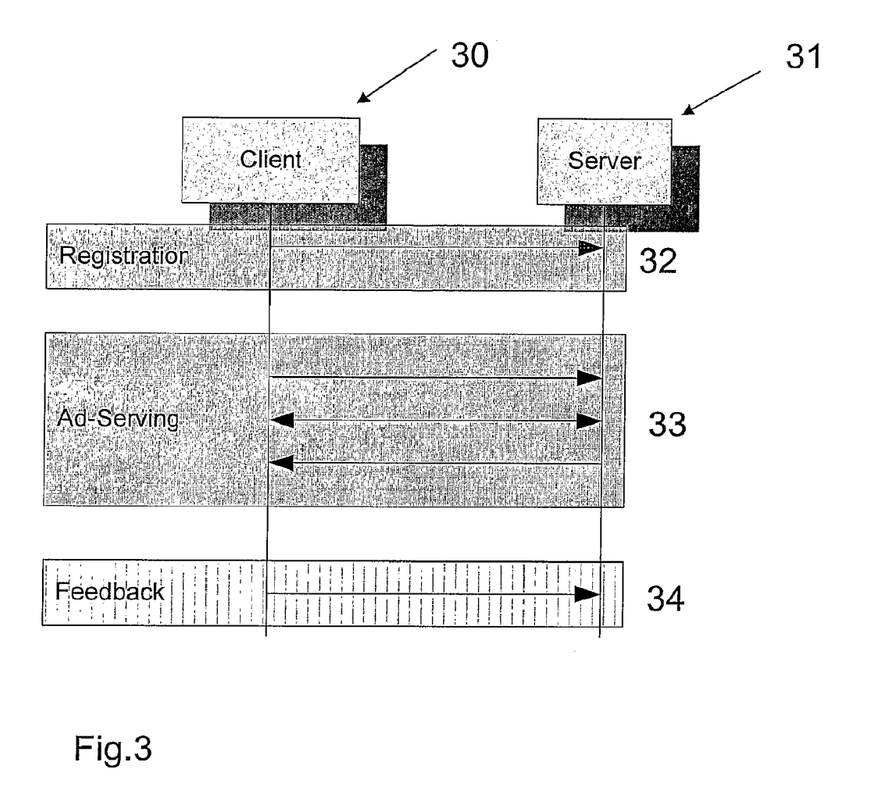
FIG. 3 shows content serving.

Registration (32)

This phase of the protocol is executed after the user downloads and installs the client software. (In another embodiment, the wireless operator or the handset manufacturer may install the client software on the phone prior to the user purchasing it. In that scenario, there is a distinct subsequent phase, called activation of the client, when the phone is sold to the user, and the registration protocol is executed as part of the activation phase rather than at the time of the installation.) The registration protocol consists of a single message sent by the client to the server. The message is sent as a SMS text message. The contents of the message are the International Mobile Subscriber Identity (IMSI) number of the client device and the International Mobile Equipment Identity (IMEI) number of the client device. When the server receives the SMS text message, it looks up the Mobile Originator (MO) number of the sender of the message. The server then creates a record for the client in its database of clients, using the IMSI, IMEI and the MO numbers. The MO is used to look for an existing user profile. If no user with that MO is present in the server's database of users, a new, empty user profile is created and populated with the MO. The newly created user profile is linked to the entry for the client and used in the subsequent phases of the protocol. The profile is also marked as being empty and in need of filling-in by other components. If a user-profile is found for the MO, then that user-profile is linked to the entry for the client, and used in subsequent phases of this protocol.

Content Serving (33)

When the user of the client device initiates an SMS message, or receives an SMS message, the Ad-Serving phase of the protocol is triggered. Depending on whether the user is composing an SMS message or receiving one, some details of the protocol vary. But generally, the following actions are taken:

Session Initialization

Figure 4:
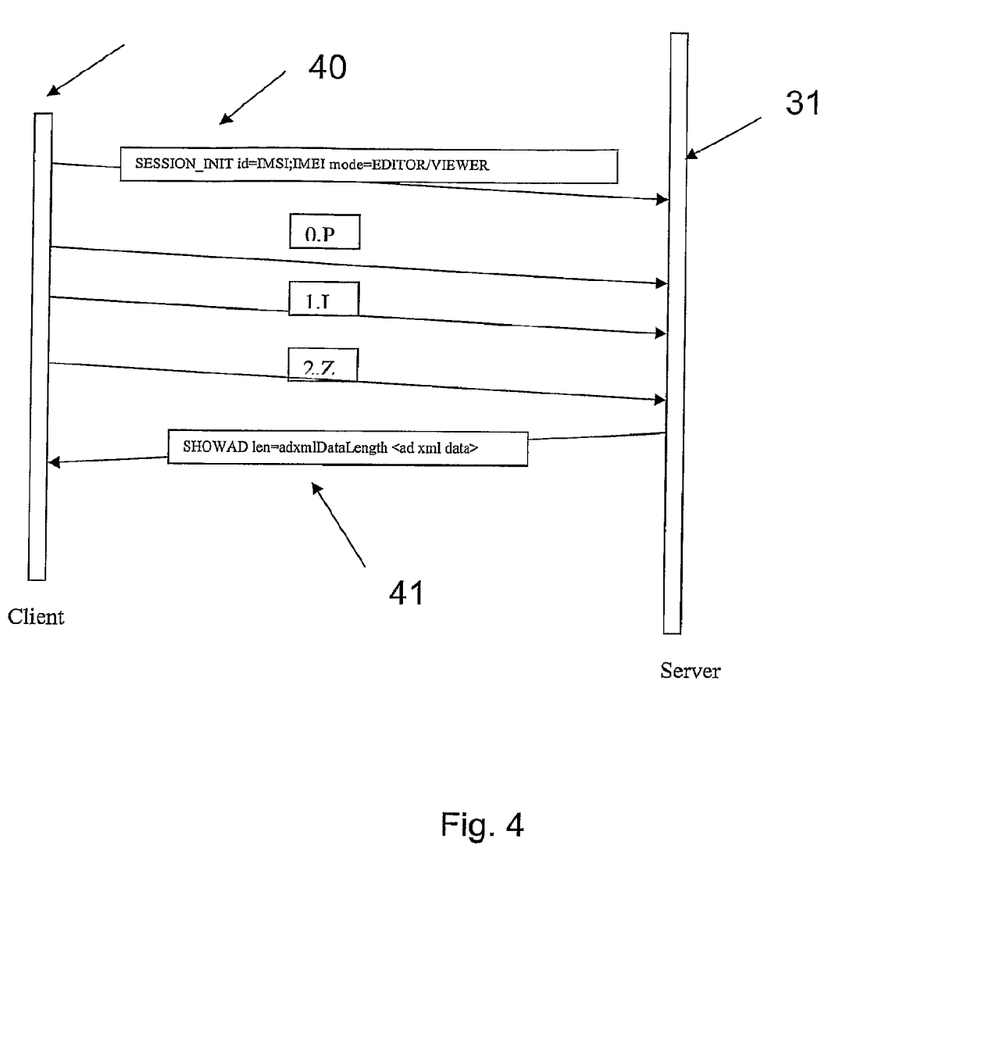
FIG. 4 provides more detail thereof.

The first message sent by the client in this phase is a SESSION-INIT message 40 (FIG. 4). A SESSION-INIT message contains the client's IMSI and IMEI number, and a MODE indicator. Upon receiving the message, the server uses the IMSI and IMEI number to look up a client entry in its database. If an entry with matching IMSI and IMEI numbers are found, then that entry is used for subsequent actions. If no such entry is found, then the server sends a NOT-AUTHORIZED message to the client. If the client receives a NOT-AUTHORIZED message as the first message from the server, it disconnects from the server and goes back to the Registration Phase. It does not communicate any more to the server for the duration of the current SMS composition or viewing. It retries this phase of the protocol, starting with a SESSION-INIT message, when the user initiates an SMS compose or receive action the next time. The MODE indicator is an integer field identifying the "mode" the client is operating in. One value, called EDITOR-MODE, is used by the client to indicate that the user is composing a message. Another value, called VIEWER-MODE, is used by the client to indicate that it is contacting the server because the user has received a SMS message.

Data Input Delivery

If this phase was triggered because the user has received an SMS message, the client sends a single message to the server of the type INSMSG. If this phase was triggered because the user is composing an SMS message, the client sends multiple messages to the server, each message being any one of the following types:

INSMSG: this message indicates that some characters were input at a certain position by the user. In the situation where the SMS is a received SMS, this message will contain all the characters in the SMS text.

DELMSG: this message indicates that some characters at a certain position have been deleted by the user.

RPLMSG: this message indicates that some characters at a certain position have been replaced by the user by some other characters.

Ad Delivery

If the session was started in the "VIEWER-MODE" by the client, the server performs the following actions:

1. It waits for the INSMSG containing the full SMS text, from the client;
2. Upon reception of the INSMSG, it looks for a relevant ad or other content (this function is discussed in detail below); the protocol then follows steps 3-9. If the session was started in the "EDITOR-MODE", the server waits for one or more INSMSG, RPLMSG, or DELMSG from the client, and at the reception of each message takes the subsequent steps.
3. If a relevant ad or content is found, the server compares the relevance value of the ads or contents to a threshold value. If the relevance value is lower than the threshold value, or if no ad or content is found, the server sends a USECLIENTCACHE message to the client. This message indicates that the server is unable to furnish a relevant ad or content and the client should show some ad or content using its local cache (discussed in more detail below).
4. If a relevant ad is found, whose relevance value is higher than the threshold value, the server checks if the ad or content is already cached on the client. If the ad is cached on the client, the server sends the client a DISPLAYCACHEDAD message. This message contains the globally unique identifier for the ad, and indicates to the client that the client should retrieve the ad with that identifier from its local cache and display it to the user.
5. If a relevant ad with a high enough relevance is found as above, but the server detects that the ad is not cached in the client, the server looks up the "caching-factor" value for the ad (discussed in more detail below). If the caching factor value is above the global "caching-threshold" value, then the server sends a SHOWANDSTOREAD message to the client. This message contains the full contents of the ad, and indicates to the client that it should not only display the ad to the user, but also store it in the local cache.
6. If, in the above step, the "caching-factor" of the ad was below the "caching-threshold" value, the server sends a SHOWAD message 42 to the client. This message contains the full contents of the ad and indicates to the client that it should display the ad to the user, and discard the contents once the ad has ceased to be displayed.

Session Termination

The session is terminated when:

The client has received an ad successfully;

The server could not find an entry for the client after the SESSION-INIT message.

There is no special termination message. The client or the server simply closes the connection. By way of example, the process may be better understood by further reference to FIG. 4.

1. The client instantiates a TCP connection with the server and immediately sends a SESSION-INIT command, containing its identifiers, and indicating that the client is operating in the EDITOR mode. The server accepts the client's identification and does not send back a 'NOT-AUTHORIZED' message.
2. The client sends successive messages to the server as the message is being composed by the user. In this illustration, they are:
   a. 0, P: this message indicates that character 'P' has been inserted at position '0' (the beginning) of the message by the user.
   b. 1, I: this message indicates that character 'I' has been inserted at position '1' by the user;
   c. 2, Z: this message indicates that character 'Z' has been inserted at position '2' by the user. In our illustration, these messages will all be of the type INSMSG as described above. After these three messages, the server will conclude that the user has composed 'PIZ'.

The server is continually executing relevance search based on the input seen so far. In our illustration, it is able to conclude after three messages that a relevant enough ad (about, for e.g., pizza) exists, that the said ad is not cached, and sends the client the SHOWAD message, as described above, containing the ad.

Feedback

When the client displays an ad to the user, it also presents a way for the user to indicate his or her satisfaction for the ad. In one embodiment, this is implemented as a menu option on the display screen that allows the user to rate the ad on a scale. The feedback phase of the protocol consists of a single RATING message from the client to the server. This message contains the ad or contents globally unique identifier, the client's IMSI and IMEI, and the rating assigned by the user. The feedback may be presented at any time, and not necessarily after the ad-delivery phase. In particular, the user may visit the history of the ads that have been displayed and stored in the local cache by the client, and may assign ratings to them, including new ratings for ads that have already been assigned ratings.

Relevance Engine

The relevance engine is the component in the server responsible for finding relevant ads or content in response to the client's inputs, and also deciding when and which ad should be shown to the client. This function may be subdivided into two more functions.

Ranking

At any given point of time in this phase of the protocol, the server has an idea of the contents being viewed or composed by the user. It uses the text of the contents, and the profile of the user, to conduct an incremental search over its database of ads. Conceptually, for each ad, a score is computed. The score is a number that indicates how relevant the ad is to the user. The relevance is actually a composite metric that takes into account these factors:

Whether the contents of the SMS message have any bearing to the ad being served;
Whether the user's profile indicates he/she will find the ad relevant;
If the date and time of this session has any bearing on whether an ad is relevant to the user;
Whether the user's past history indicates that the same ad or a similar ad has already been displayed to the user. The score can then be used to "rank" the ads in an order of relevance. Obviously, for performance, some of the partial metric that constitute the final score are precomputed. The scoring action then becomes a matter of computing some real time metrics and combining them with the precomputed metrics, for every ad in the database.

Thresholding

The threshold computation is relevant to the situation where an SMS is being composed, and is the embodiment of two observations. The first observation is that the time taken to compose an SMS text, and the length of the SMS text, follows a probability distribution with known mean and variance. The mean and variance may vary between classes of SMS messages, and between users. The second observation is that as more SMS text is available, the more capable is the ranking function described in the previous section of finding the optimal ad or content relevant to the user. Hence it is advantageous to not serve an ad or content as soon as one is found based on the current user input, but to wait for more user input in the hope that an even more relevant ad or content may be found. However, the longer the server waits to serve an ad, the higher the probability that the user will have finished composing the SMS and terminate the session.

Combining the two observations, a thresholding algorithm is constructed. This algorithm takes as inputs a user profile, a temporal probability distribution of SMS composition, and the current SMS contents. It then computes a threshold value as a function of the probability that the SMS is about to be terminated. The higher the probability that the SMS is going to be terminated soon, the lower the threshold. The threshold is directly related to ad or content relevance scores: it indicates how relevant an ad or content should be before it is served. If no ad or content with a relevance score higher than the threshold is found, the server waits for more input from the client. If an ad or content with relevance higher than the threshold is found, then the server serves that ad or content to the user and terminates the session.

The server thus uses the outputs of the ranking function and the thresholding function to make the decision whether an ad should be served or it whether it should wait for more user input.

The relevance/thresholding relationship may be refined through feedback, for example the number of functional ad activations or consumer ratings. Moreover ad suppliers may specify some conditions under which their ads should be given preference. In this way operational performance is improved by both automated and human intelligence and experience.

NLP (Natural Language Processing) Engine

Users of SMS do not often use the same linguistic conventions as are prevalent in other media (for e.g., emails, handwritten letters, and print). In particular, SMS messages contain alternative spellings (often acronyms) for common words, and an abbreviated grammar.

The NLP engine of the server is the component responsible for adapting ad or content specification offered by the content provider to the linguistic conventions of SMS messages. It functions in two phases.

Ad Adaptation

At the point of content creation and uploading of the ad or content into the system, the advertiser is asked to specify the context in which the ad is relevant. One-part of this context is a list of "keywords"—words appearing in a SMS message that are good indicators that the user is composing text about a topic that the ad is relevant to. The NLP engine takes as input the set of keywords specified by the advertiser and outputs another set of keywords, augmenting the original set. The augmented set contains spelling variants of the keywords specified by the advertiser that may occur in SMS texts. The NLP engine takes into account the target user demographic, as specified by the advertiser. In particular, users of different ages, affluence, and cultures will tend to use different linguistic conventions, including alternative word forms.

Reverse Tuning

When an ad rating is received from a client device, the rating is input to the NLP engine, along with the ad contents, the SMS text that led to the ad being served, and the output of the ranking engine for that ad and SMS text. The NLP engine observes those keywords in the SMS that were not matched to any keyword in the ad, and tries to match them to the keywords in the ad. The output of this phase is a list of words from the SMS that are possible matches to the keywords in the ad, along with a score. The higher the score, the more the likelihood there is that a word matches a keyword. The score is a composite metric and takes into account:

Similarity in spellings of a word and a keyword in terms of a hamming distance;
Similarity in the "sound" of a word and a keyword, as an output of a soundex algorithm and pronunciation dictionary. The words are then put into a queue, prioritized according to the score. The queue may be subsequent reviewed by a human operator as candidate keywords. Another usage of the words would be to automatically include them as keywords without human intervention if the score is high enough—that is higher than the "inclusion threshold". This is discussed in the next section.

Reflective Learning

When the NLP engine is used to automatically include candidate words as keywords for an ad, an entry is made into the server's database for the candidate keywords to be reviewed by a subsystem of the NLP engine, called the Reflection System. When a certain number of ratings from users for a given ad are collected, the Reflection System reviews the output of the ranking function for that ad and the SMS texts that led to the ad being served. If the ranking function used an automatically generated keyword for the match, then the reflection system takes one of two actions:

If the average rating assigned by the users was higher than neutral, and the automatically generated keyword contributed more than a certain percentage to the overall score, then the inclusion threshold is reduced by a certain number.

If the average rating assigned by the user was neutral or negative, and the automatically generated keyword contributed more than a certain percentage to the overall score, then the inclusion threshold is increased by a certain number. The reason the threshold is increased even when the rating is neutral is because an extra candidate keyword has lead to additional processing effort on the server, but no appreciable increase in relevance to the user.

Intelligent Ad Caching System

The ad server system contains an ad caching mechanism and protocol for enhanced performance and user experience. The protocol is executed between the client and the server, like the real time ad-serving protocol, but it uses a separate channel. The protocol is described first, followed by an explanation of the server functions that aid the execution of the protocol.

Ad Cache Serving Protocol

In one aspect of this system, the client periodically initiates the protocol at predefined times and intervals. In another aspect of this system, the server determines that a client needs to update its cache, and sends a specially formatted SMS message to the client. Upon reception of the SMS, the client initiates the cache update protocol. At the start of the protocol, the client connects to the server and sends a GETCACHE message. This message indicates its IMEI and IMSI numbers, and requests the server for a cache update. In one implementation, this connection is established over HTTP, and the message processing method used follows the conventions of the CGI (Common Gateway Interface) mechanism. If the server does not recognize the client's identifiers it sends an error indicator and closes the connection. In the HTTP implementation the HTTP 401 status code is used for this purpose. When the client has connected and offered correct identifiers, the server checks its local ad cache database to detect if the client's cache needs to be updated. If there is no need for the client to update its cache, the server sends an indicator to the client that no content is available and closes the connection. In the HTTP implementation, the HTTP 401 status code is used for this purpose. If the database indicates that the client's cache needs to be updated, the server computes the changes to be made to the clients cache and sends a specification to the client. The specification consists of ads to be downloaded by the client, ads to be removed from the client's local cache, and the new default ad to be used by the client if necessary. In the HTTP implementation, the cache specification is sent as an XML document. When the client has received a cache specification, it parses the specification and takes the following actions:

If the specification dictates one or more ads are to be deleted, the client deletes them from the local cache and removes links to those ads from its ad history. The user is then unable to browse those ads while checking the history.

If the specification dictates one or more ads to be downloaded, the client sends a number of GETAD messages to the server. As a result of processing the GETAD message, the server returns to the client the requested ad. In the HTTP implementation, the GETAD message is a GET HTTP request and the processing is done by a CGI which returns to the client a binary file containing the requested ad.

If the specification dictates that the default as has to be changed, the client proceeds as in the normal ad download, except that it uses the received ad contents to replace the contents of the default ad. When the client has finished processing the cache specification, it sends a SYNCREPORT message to the server, indicating the results of processing each command in the specification. In the HTTP implementation, the SYNCREPORT message is implemented as a HTTP PUT request, and the body of the PUT request is a file containing the formatted specification of the results of processing the commands in the cache specification.

Ad Cache Construction

In order to make a good cache specification, the server needs to compute the following variables:

Which of the ads in its database are relevant to a given client (using only the profile information available to the server);

What kind of messages, in terms of keywords, is the user of the client likely to send in the near future (using the recent history of messages sent by the user);

Which of the relevant ads found in the first step are relevant to the messages likely to be sent by the user;

How much storage is available on the client (using its knowledge of the client device and the ads currently cached in the device);

Which of the ads found in the third step above will fit best in the available storage.

Once the server has computed these variables, it arrives at a list of ads that should be in the cache. The server compares this list to the list of ads that it knows are already in the client's cache and:

If the current cache contains an ad that is not in the new list, it is flagged for deletion;

If the policy for the client does not forbid changing the default ad, the ad in the new list that was the most relevant ad in step 1 (i.e., based solely on the user profile) is flagged to be made the default ad.

Out of the remaining ads, if the current cache does not contain an ad that is in the new list, it is flagged for addition.

Ad Cache Usage

The ad cache is used in two scenarios.

Real Time Ad Serving

During the real time ad serving protocol, when the server computes a composite relevance score for each ad, the score is incremented by a certain amount for the ad if it already occurs in the client's cache but is not the default ad. If the ad is in the client's cache and is the default ad, its score is decremented by a certain amount. This mechanism slightly favours the display of ads that are cached by a client. When the server decides to serve a cached ad, it merely has to indicate the identifier of the ad to the client. The client is able to retrieve the ad from its local cache and display it to the user, instead of having to download the contents of the ad from the server. The result is that an ad may be served faster, reducing network bandwidth consumption, and enhancing user experience.

Ad Displays During Network Disruption

At times of poor network connectivity, the client may fail to connect to the network. Alternatively, the server may determine that the client may take a very long time to communicate the SMS contents to the server, and send the client a USE-CLIENTCACHE message. In both situations, the client uses a simplified version of the keyword matching algorithm to match the SMS contents against the keywords of the ads stored in its local cache. The ad with the highest matching score is displayed, as long as its score is above the "local-displaythreshold" value.

One possible appearance of the mobile phone interface during message composition (a) and after sending (b) is shown in FIG. 5. In particular, the form of the advertising or information portion may be different during each phase, for example enticing during sending and more detailed thereafter. The content may be arranged such that links may be followed to order a product or service therefrom.

Ways in which the present invention maybe useful or relevant to various user will now be considered.

The consumers who sign up for economic incentives will primarily use advertising-subsidized mobile telephony. (We will term these as customer type A). However, it is also an objective to increase the appeal of the product to all consumers who may not sign up with directly. Such customers may want to use advertising-subsidized mobile telephone only occasionally. (We will term these as customer type B). In one mode of use, the consumer is provided with the ability to turn the adbar on and off by for example of sending an electronic message. When he turns the adbar on, he will be able to send a discounted or even free electronic. Similarly, he will receive an economic incentive to read the electronic he receives with the adbar on. Otherwise, the phone behaves as before.

EXAMPLES

1. Customer Alex (customer type A), male, 25 has specified one of his interests as video games. He also works in the city. His office is close to a shopping mall where a games console manufacturer is having a roadshow of their latest models. The adbar service would let Alex know of this roadshow in advance, and also provide him a reminder at lunch-time about the Promotion.
2. Customer Linda (customer type A), female 18 is typing out an electronic message which includes the key word "movie". The adbar client is sending the data back in real-time even before the electronic message is completed. The adbar server looks up Linda's personal profile, age, location information and the current time. It determines that a new movie with Linda's favorite star, Mel Gibbs is running at a theatre close to Linda's home. It lets Linda know of the same and provides her a discount coupon for 2 people to watch the show right away.
3. Customer Max (customer type B) who has not signed up for the adbar service has however downloaded our application after filling out his profile details. He goes to the phone menu and sees the following options If the customer chooses to send free electronic, the adbar client is activated. It then does its function of delivering targeted advertising as the electronic message is being typed out. If the customer does not wish to have advertising sponsored electronic messaging, he chooses the normal electronic for which the mobile service provider will bill him.

Similar to the above, we will have a choice for receiving free electronic as well.

4. Customer Tom (type A or B) was served an advertisement for digital photo printing services at a location close to him with a discount promotion while he was browsing the pictures that he had taken through his mobile phone. However, he is not interested in printing right now. The next day however, he remembers the promotion and would like to use it. He uses his mobile phone and through simple intuitive use of the interface, he is able to browse and search the history of the ads served and find the right promotion. If the local cache of ads served does not contain enough historical information (if Tom wants last months ads), he could access the information through a website where he will have a secured access.
5. When Tom is browsing previous ads on his mobile phone, it is possible that one of the contexts has changed significantly. For example, he might be looking at a digital photo printing service associated with his past location and not present. The system will be automatically able to adjust for this by dynamically accounting for which context (user, keyword or location) has changed and prompting the user to whether it should display an updated version of the digital photo printing ad to account for the changed context.

The invention claimed is:

1. A system, comprising:
a terminal device having a data communications client arranged to communicate with one or more remote devices via a data communications client channel, the terminal device configured to:
establish a communications link to a remote data system, the communications link being separate to the data communications client channel;
capture and transmit data being entered, accessed by, derived from or predicted from data being entered, accessed or received by a user, and
receive information, advertising or other relevant data from the remote data system via the communications link,
the information, advertising or other relevant data is selected dependent on the transmitted data;
the data communication system is arranged to transmit data as it is captured in successive messages to the remote data system, the remote data system being arranged to select the information, advertising or other relevant data in dependence on data from the received messages and to refine said selection upon receipt of data in one or more further messages from the data communication system;
the remote data system comprises a user profile, the remote data system being arranged to select the information, advertising or other relevant data in dependence on received data and in dependence on the user profile;
the remote data system comprises a pre-computed metric for each item of information, advertising or other relevant data, the metric identifying relevance of a the respective item to a user, said relevance being pre-computed in dependence on said user profile, the remote data system being arranged to score each item in dependence on received data and on the pre-computed metric for the respective item and to select the information, advertising or other relevant data in dependence on the score; and the data communications client is an SMS client, the remote data system including a thresholding algorithm taking inputs of the user profile, a temporal probability distribution of SMS composition and received data from the data communications client, the thresholding algorithm being executed by the remote data system to generate a threshold value that is inversely proportional to probability that an SMS message being composed on the SMS client is about to be terminated, wherein the remote data system is arranged to select an item of information, advertising or other relevant data having a score higher than the threshold value for transmission to the data communication system and to otherwise wait for further data to be received from the data communications client.

2. A system according to claim 1, wherein the data communications system is arranged to locally cache items of information, advertising or other relevant data, each item having an identifier, the remote data system being arranged to transmit an identifier of a selected item to the data communications system.

3. A system according to claim 2, wherein the remote data system comprises data identifying items cached at the data communications system and is operative to increment the score for each locally cached item and decrement the score for a locally cached item that has been predetermined to be the default item.

4. A system according to claim 2, wherein the remote data system is arranged to send an SMS message to the data communications system to trigger the data communications system to update the local cache.

* * * * *